A. COHEN.
CASTER.
APPLICATION FILED NOV. 14, 1917.

1,278,436.

Patented Sept. 10, 1918.

A. Cohen,
Inventor.
By Albert E. Parker
Attorney

UNITED STATES PATENT OFFICE.

ALEXANDER COHEN, OF HAMILTON, NEWCASTLE, NEW SOUTH WALES, AUSTRALIA.

CASTER.

1,278,436.　　　　　　Specification of Letters Patent.　　Patented Sept. 10, 1918.

Application filed November 14, 1917. Serial No. 201,960.

*To all whom it may concern:*

Be it known that I, ALEXANDER COHEN, subject of the King of Great Britain and Ireland, residing at Hamilton, Newcastle, New South Wales, Australia, have invented new and useful Improvements in Casters, of which the following is a specification.

This invention relates to pivot mounted casters for pianos, bedsteads, wardrobes, chairs, and other articles of furniture, and for platform and luggage trucks and other roller mounted articles, and it has for its objects to apply the weight of the furniture, truck, or other article directly above the wheel axle while facilitating automatic swiveling of the caster and relieving the pivot post of lateral stress, and generally to improve the structural features of the caster parts, and to simplify and cheapen the manufacture of casters, particularly casters destined for supporting heavy articles.

Casters according to this invention are adaptable by modification of the form of the pivot flange for fitting either to flat bottomed articles such as wardrobes, or to furniture legs.

My caster comprises a flange with a dished annular bearing face, a pivot post fixed in said flange concentrically with said annular bearing face, and a swivel fork having an offset hub adapted to said pivot post and also having two bearing faces one on its shoulder directly above the roller axle fixed in the fork jaws and the other adapted to a spherical surface annular bearing around the base of the pivot post. The flange is mounted as usual on the base of the article which it carries by a leg socket, tang screw, flange screws or otherwise.

Figure 4:
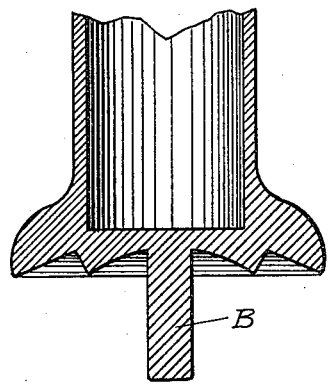
Figure 2:
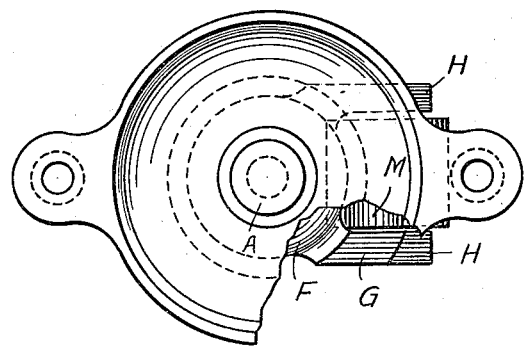
Figure 1:
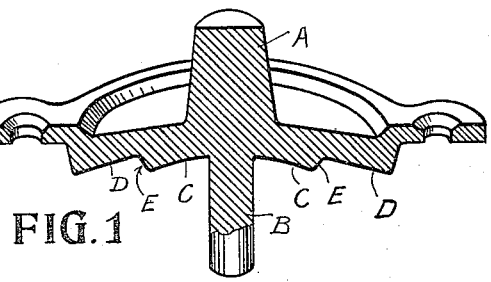
Figure 3:
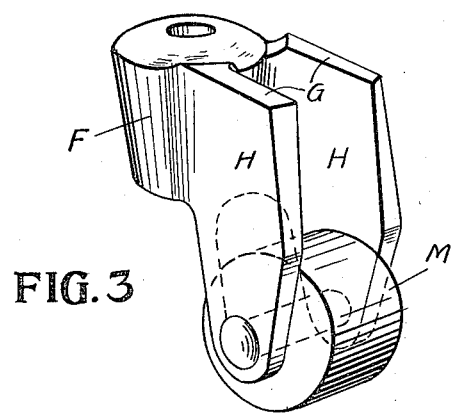

In the accompanying drawing, Figure 1 is a sectional perspective view of the foot flange as made for flat bottomed structures; Fig. 2 a plan of same with caster bracket and wheel fitted and partly shown through a broken away portion of the flange; Fig. 3 a perspective view of the caster bracket and wheel separate from the bracket mounting; Fig. 4 an elevational view explanatory of the modification of the foot flange to adapt it to a tubular bedstead post; and Fig. 5 a vertical section showing a caster with socket flange base fitted on a table or piano leg.

It will be understood that the upper part of the flange may be modified according to the structure of the furniture or article on which it is to be mounted. It may be flat as in Fig. 1, with or without a centering dowel A, or socketed as shown in Fig. 4 or Fig. 5, or otherwise modified.

The post B may be integral with the flange or screwed or riveted into or otherwise fixed in the flange. It may be cylindrical or taper. Ordinarily a wrought steel pin forms the post, and it is fixed in the base, which is of cast metal, either in the molding operation or by screwing, keying, riveting, or spot welding.

The inner spherical annular bearing surface C is struck from a center located below the lower end of the post B but above the floor line. The outer annular bearing surface D which is separated from the spherical annular bearing surface C by a shoulder ring E is flat in cross section but splayed downwardly. Its cross section is tangent to a circle struck from a point located below the radial center of the curve of the surface C and concentric therewith.

Figure 5:
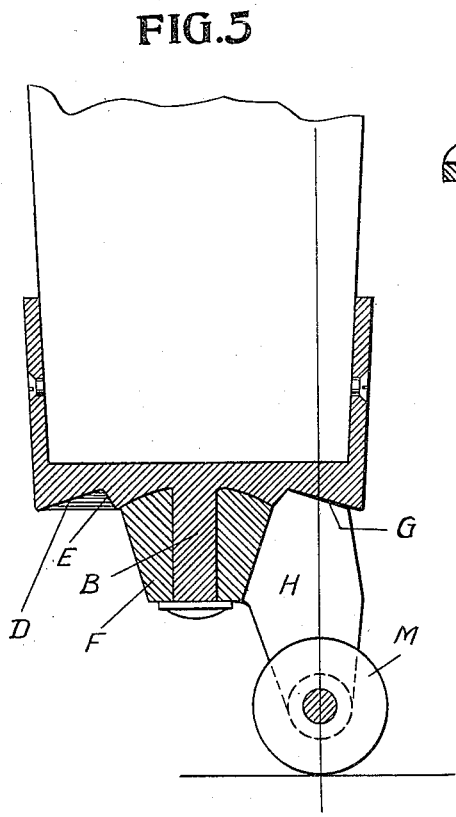

The bracket hub F is rotatably carried on the post B, being rotatably secured thereon by a washer and riveted end as in Fig. 5 or by a split pin or otherwise. Its top surface is curved complementarily to the spherical annular bearing surface C against which it bears upwardly. The shoulders G of the bracket arms H are inclined complementarily to the flat dished annular surface D against which they bear upwardly. The bracket shoulders may be bridged across to offer greater bearing area against the surface D. As will be seen clearly on reference to Fig. 5, the axle K of the caster wheel or roller M is located directly below the annular bearing surface D so that the thrust of the load is directly downward on the wheel M, the bearing about the post B being thus left free of the load so that the bracket may swing readily about it to allow the wheel to move into running alinement with the direction in which motion is applied to the furniture or other article when being moved from one place to another. The angular disposition of the bearing surfaces C and D with the intervening step E which acts as a collar is such that the radial thrust is not thrown on the pivot post and so the pivot post is substantially relieved of lateral stresses during movement. Owing to the roller axle being located directly under the annular bearing surface D there is no lateral stress on the post B while the caster is at rest, and consequently no tendency to bend or break the post B.

What I claim as my invention and desire to secure by Letters Patent is:—

1. A caster wherein the vertical thrust of the load is applied to the roller fork directly above the roller axle through a dished annular bearing surface on the underside of a carrier flange, and wherein centering is maintained by a center post pivot on which the fork hub is mounted and by a spherical surface ring concentrically disposed about the root of said center post pivot and separated from said dished annular bearing surface by an annular step.

2. A caster comprising a flange, a central pivot post thereon, a spherical surfaced annular bearing on the underside of said flange and concentric therewith, a wheel bracket having a hub on which said bearing is adapted to bear, a dished flat-surfaced annular bearing inclining downwardly and concentric with said spherical surfaced bearing, an annular step between said flat-surfaced and spherical surfaced bearings and inclined upwardly to the flat surface from the base of the spherical surface, a roller fork with bearing shoulder fitted to said flat annular bearing with the roller axle directly below said bearing, and an off-set hub on said fork fitted to said pivot post and to said spherical surfaced bearing.

In testimony whereof I have signed my name to this specification in the presence of two subscribing witnesses.

ALEXANDER COHEN.

Witnesses:
CHARLOTTE WILLIAMS,
G. JOHNSTON.

Copies of this patent may be obtained for five cents each, by addressing the "Commissioner of Patents, Washington, D. C."